United States Patent Office 2,987,927
Patented June 13, 1961

2,987,927
STABILIZING AND CALCULATING MECHANISM
George Agins, Brooklyn, N.Y., assignor to American Bosch Arma Corporation, a corporation of New York
Filed Aug. 30, 1945, Ser. No. 613,685
10 Claims. (Cl. 74—5.4)

This invention relates to stabilizing and calculating mechanism and has particular reference to mechanism for use in stabilizing and correcting the position in space of instruments mounted on unstable supports, such as ships, aircraft and tanks.

In order to stabilize a line of direction in space, such as the direction of a range-finder, when the support of the same is on a travelling and unstable surface like the deck of a ship, it is necessary to know continuously the angular relation of the supporting surface with reference to the vertical as established by a gyroscope or other long period pendulum. But since such pendulums are themselves subject to disturbances, the present invention provides means of preventing errors, arising from any causes, in order to provide accurate stabilizing angle values.

In accordance with the invention, a stabilizing and calculating mechanism is provided which eliminates or compensates both predictable and unpredictable precessions of the gyroscope, such as those caused by earth rotation and movements of the supporting craft on the one hand, and bearing friction, air currents, magnetic fields and the like, on the other hand, as well as errors due to changes in latitude of the supporting craft, whereby greater accuracy, reliability, flexibility of operation and use are obtained.

The invention comprises a constantly rotated universal gyroscope to which a correcting moment is instantaneously applied in opposition to an unpredictable precession and which provides angular values related to the position and unstable movement of the craft and transforms them into equivalent angular values immediately usable by remote instruments and transmitted thereto by a novel self-synchronous transmission system including means for applying torques to the gyroscope to neutralize predictable apparent precessions thereof. Means are also provided as a part of the transmission system for magnetically relieving the gyroscope suspension bearings of the weight supported by the corresponding journals. Other features and advantages of the invention will become apparent upon reference to the accompanying drawings, in which:

Figure 1:
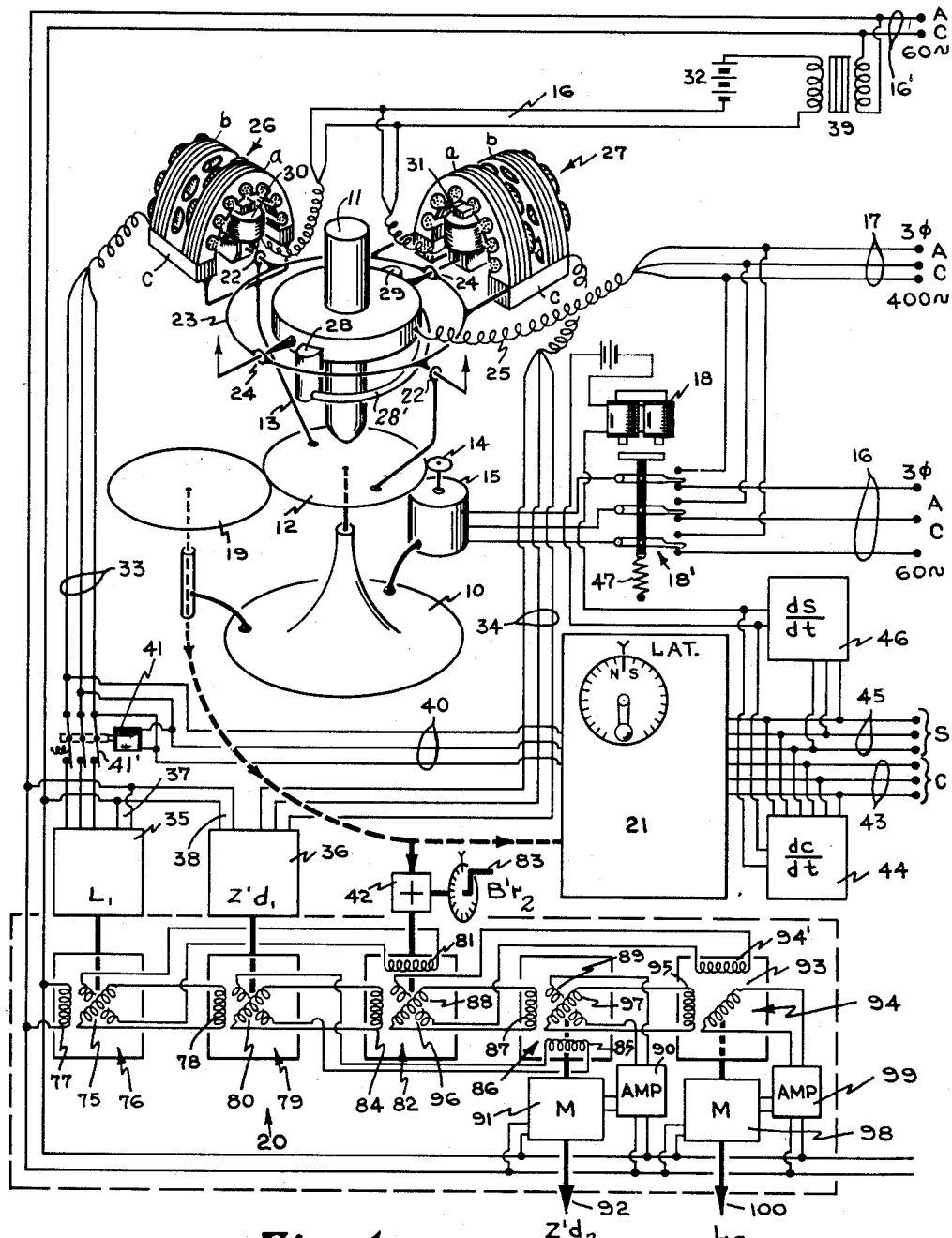
FIGURE 1 is a semi-diagrammatic illustration of a preferred form of the stabilizing and calculating mechanism of this invention.

Referring to FIG. 1, numeral 10 designates a base fixed on an unstable platform such as ship, tank or airplane, and supporting the encased gyroscope 11. Rotatably mounted in the base 10 is gear 12 integral with a frame 13 and adapted to be rotated in an unstable plane preferably parallel to the deck, by pinion 14 of motor 15. Motor 15 is of the induction type and is supplied with three-phase alternating current from either source 16 or source 17, according to the position of switch 18' determined by the action of the relay 18, for purposes to be described. A second gear 19 is rotatable on the mount 10 in order to take off rotation of the frame 13 at a one-to-one ratio for use in the angle computer 20 and the latitude calculator 21, to be described.

Pivoted in sensitive ball-bearings 22 in the opposite arms of the frame 13, is a gimbal ring 23 which in turn carries at right angles to the axis 22—22 two other sensitive bearings 24 for receiving the journals of the gyroscope casing 11. The gyroscope 11 is mounted in neutral equilibrium (being neither pendulous nor top heavy) about its suspension axes 22—22 and 24—24. Within the casing 11 is a heavy gyroscope wheel journalled on vertical bearings and spun under the influence of the three-phase high frequency current fed from the source 17 through slip-rings or similar means not shown but connected to the cable 25.

Supported on frame 13 and gimbal ring 23 at axes 22 and 24 are respective units 26 and 27 which are actually self-synchronous transmitters in which halves of the normally circular stator, $a$ and $b$, are separated and paired side by side, while the magnetic circuit is completed by yokes, $c$, as shown. The rotors, which are indicated at 30 and 31, are similarly folded over and thus the angle transmission feature is retained and a novel and useful feature added, in that both these self-synchronous units act like electromagnets to apply upward pull on the journals supported in the sensitive bearings 22 and 24. The rotors 30 and 31 are fed from source 16' through transformer 39 with the addition of the direct current source 32 to enable the magnetic pull to be increased.

Although two self-synchronous units 26 and 27 are shown in FIG. 1, it will be understood that four would actually be used, one for each of the bearings 22 and 24, the remaining two, not shown, being indicated in the drawing by upward arrows. By thus overcoming the weight upon the sensitive bearings 22 and 24, they are rendered much freer and therefore puts less drag on the gyroscope motion as it swings in response to the instability of the mount, thereby relieving the liquid erecting system of a difficult extra duty. The liquid erecting system for gyroscope 11 consists of two opposite tanks 28 and 29 connected by pipe 28' and containing mercury as the ballistic liquid, and is disclosed in greater detail in copending application Serial No. 95,722, filed August 12, 1936, and now Patent No. 2,817,239, for example.

In addition to relieving the bearings 22 and 24 of journal weight, the semi-circular self-synchronous units 26, 27 act exactly like the usual circular types in that they have single-phase alternating current impressed on their rotors which produces, in the triple-wound stators, three voltages, the relative root-mean-square values of which indicate the angle between the rotors and stators. These angle-defining voltages are fed by leads 33 and 34 to the self-synchronous receivers 35 and 36 where they are opposed to similar voltage groups generated in the usual way in the receivers. When no current flows in the leads 33 and 34 the self-synchronous units 26 and 35 will have the same angle and the self-synchronous units 27 and 36 will have the same angle, as is common practice. The units 35 and 36 receive single-phase alternating current for their rotor coils by the leads 37 and 38 which are to be understood as being permanently connected to the alternating current source 16'.

In addition to the two described purposes served by the self-synchronous units 26 and 27, i.e., they transmit the gimbal angles out to the computer 20, and they relieve the pressure on the sensitive gimbal bearings 22 and 24, they also serve a third purpose. As is well known, a gyroscope so mounted tends to turn over as as the earth rotates and as the mount travels, the rate of turnover being easily calculated and this tendency therefore is a predictable apparent precession. In order to prevent such predictable apparent precession, torque must be applied about the axes of the gyroscope 11 when these axes lie in certain positions in their rotation on base 10. This torque, in the present invention, is applied by putting a rotary drag on the rotors of the synchronous transmitter units 26 and 27 at the proper instants in the rotation of the unit 13. The method used is based on the phenomenon that if the receiver of a self-synchronous system is purposely prevented from aligning with the transmitter, a torque is applied to the rotor of the transmitter. In this case, such a torque is applied to unit 26 by a special self-synchronous receiver in the calculator 21 to be described in detail in connection with FIG. 4 of the drawings. The leads from this drag-producing self-synchronous receiver to the unit 26 appear at 40 in FIG. 1 and are joined to the leads 33, as shown.

Figure 4:
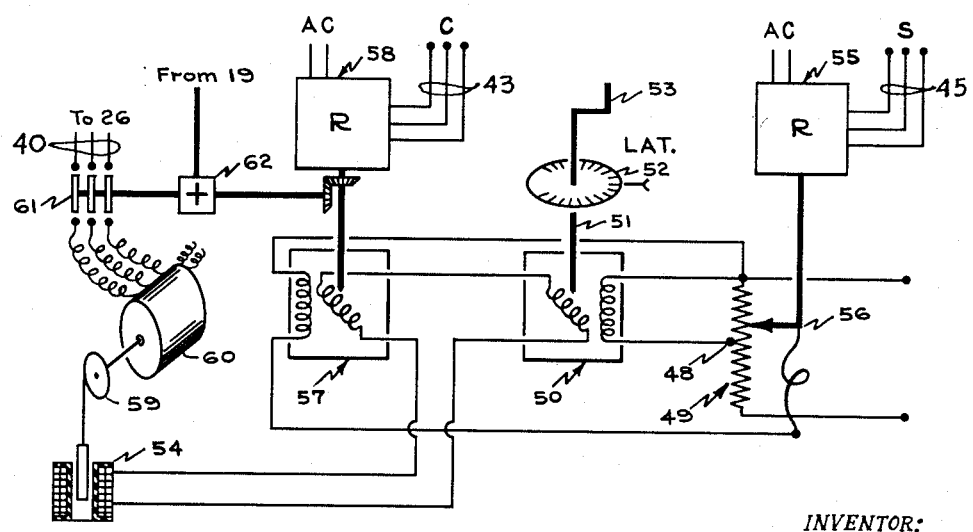

Inasmuch as such restraint on one receiver of a self-synchronous system will offset all other receivers on the same transmission line, the solenoid type relay 41 is provided to prevent offset of the receiver 35 of the computer unit 20. The drag on unit 26, due to restraint on the receiver in calculator 21, is, of course, caused by considerable current flow between it and unit 26 and such current is prevented from flowing in the stator of unit 35 by the relay 41 whenever the rotary switch 61 of FIG. 4 is closed, in order to prevent entry of a false angle value into computer 20, during the short periods when the gyroscope is being precessed.

Unpredictable precession of gyroscope 11, which proceeds from many causes, including magnetic fields, air currents, bearing friction, and the like, is prevented by the well-known method of mercury flow in a restricted pipe 28' between two tanks 28 and 29 on the gyroscope, and the influence of the rotation produced by the motor 15. It will be understood that the speed of rotation imparted to the gyroscope support 12 in this manner is of such a value that resonance comes into play in the mercury flow, thus insuring that the applied correcting force will be in a plane at right angles to the error, as is well understood. However, because the whole gimbal system is rotating about its normally vertical axis, the angle values transmitted by the units 26 and 27 are affected by a complex function of the rotation and must therefore be transformed into equivalent angles usable by the remote instrument such as a gun director, telescope or the like.

This angle transformation is effected by the angle computer 20, which takes the rapidly changing angles from transmitters 26 and 27 and an input of rotation from gear 19 and computes therefrom the deck-tilt angles $L_2$ and $Z'd_2$ in any chosen plane determined by the target bearing input $B'r_2$ through the mechanical differential 42 of the conventional bevel gear type, such as is shown in Yô Patent No. 1,500,860, for example. The angle computer thus is really a set of trigonometric converters to eliminate the effect of instrument rotation on the angles given by the gyroscope 11. Receiver 35 receives angle $L_1$ from transmitter 26 while receiver 36 receives angle $Z'd$ from transmitter 27, and the former positions the rotor 75 of induction resolver 76 at the corresponding instantaneous angle $L_1$ relatively to the stator 7, which is energized from a suitable fixed frequency alternating current source, like 16'.

The angle input thus represents the base angle of a vector triangle whose hypotenuse or radius is represented by the voltage impressed on stator 77. Accordingly, the voltage induced in one winding of the space quadrature rotor 75 is equal to the cosine, and the voltage induced in the other rotor winding is equal to the sine of the instantaneous angle $L_1$. The cosine voltage is impressed on stator winding 78 of similar induction resolver 79, whose rotor 80 is adjusted by receiver 36 in accordance with angle $Z'd_1$, whereas the sine voltage from resolver 76 is impressed on the stator 81 of resolver 82 whose rotor is positioned through bevel gear type differential 42 jointly in accordance with bodily rotation of gyroscope 11, angle $B'r_1$, and target bearing $B'r_2$, which may be introduced as an observed quantity by hand crank 83. The voltage induced in one winding of rotor 80 is impressed on stator winding 84 of induction resolver 82 and that induced in the other winding of rotor 80 is impressed on stator winding 85 of induction resolver 86, whose other stator winding 87 is energized from one winding of the rotor 88 of bearing angle resolver 82.

Resolver 86 has a null rotor winding 89 whose induced voltage is amplified in a conventional electronic amplifier 90 and fed to null motor 91 which drives null winding 89 to a predetermined zero induction angle and thus deenergizes itself. The angular movement of motor 91 to that point is the angular movement $Z'd_2$ which may be cross-level angle through which the remote instrument sought to be stabilized is moved, either directly by shaft 92 of motor 91 or the latter may drive a self-synchronous transmitter of a remote transmission system, not shown, to the same end. Similarly, the null rotor winding 93 of resolver 94, inductively responsive to the joint field of its stator windings 94' and 95 excited from the respective rotor windings 96 and 97 of resolvers 82 and 86, energizes motor 98 through electronic amplifier 99 to restore null winding 93 to non-inductive position. The resultant angular movement of the armature shaft 100 of motor 98 is the level angle $L_2$, through which the remote instrument is stabilized, either directly or through a transmission system. The angle computer 20 thus relates the remote instrument to the angular movement of the gyroscope 11 relative to the deck, just as though both instruments were located side by side for direct stabilization of one by the other.

The theory of the angle computer 20 is based on the following three coordinate transformation equations from spherical trigonometry:

(1) $\cos L_2 \cos Z'd_2 = \cos L_1 \cos Z'd_1$
(2) $\cos L_2 \sin Z'd_2 = \cos L_1 \sin Z'd_1 \cos (B'r_2 - B'r_1)$
    $+ \sin L_1 \sin (B'r_2 - B'r_1)$
(3) $\sin L_2 = \sin L_1 \cos (B'r_2 - B'r_1)$
    $- \cos L_1 \sin Z'd_1 \sin (B'r_2 - B'r_1)$ The two output voltages of resolver 76 are proportional respectively to ($\sin L_1$), and ($\cos L_1$).

The ($\sin L_1$) voltage is applied to the stator winding 81 of resolver 82, while the ($\cos L_1$) voltage is applied to the stator winding 78 of resolver 79.

The two output voltages of resolver 79 are proportional respectively to ($\cos L_1 \sin Z'd_1$), and ($\cos L_1 \cos Z'd_1$).

The ($\cos L_1 \sin Z'd_1$) voltage is applied to the stator winding 84 of resolver 82, while the ($\cos L_1 \cos Z'd_1$) voltage is applied to the stator winding 85 of resolver 86.

The two output voltages of resolver 82 are proportional respectively to ($\cos L_1 \sin Z'd_1$) $\cos (B'r_2 - B'r_1) + \sin L_1 \sin (B'r_2 - B'r_1)$, and $\sin L_1 \cos (B'r_2 - B'r_1) - (\cos L_1 \sin Z'd_1) \sin (B'r_2 - B'r_1)$.

The ($\cos L_1 \sin Z'd_1$) $\cos (B'r_2 - B'r_1) + \sin L_1 \sin (B'r_2 - B'r_1)$ voltage is applied to the stator winding 87 of resolver 86, while the $\sin L_1 \cos (B'r_2 - B'r_1) - (\cos L_1 \sin Z'd_1) \sin (B'r_2 - B'r_1)$ voltage is applied to the stator winding 94' of resolver 94.

With reference to Equation 1, the ($\cos L_1 \cos Z'd_1$) voltage applied to stator winding 85 of resolver 86, is equal to ($\cos L_2 \cos Z'd_2$). With reference to Equation 2, the ($\cos L_1 \sin Z'd_1$) $\cos (B'r_2 - B'r_1) + \sin L_1 \sin (B'r_2 - B'r_1)$ voltage applied to the stator winding 87 of resolver 86 is equal to ($\cos L_2 \sin Z'd_2$).

Resolver 86 composes the two input voltages of ($\cos L_2 \cos Z'd_2$) represented by one side of a right triangle, and ($\cos L_2 \sin Z'd_2$) represented by the other side of the right triangle, into the resultant voltage proportional to ($\cos L_2$) represented by the hypotenuse of the right triangle, and simultaneously solves the angle $Z'd_2$ between the hypotenuse ($\cos L_2$) and the side representing ($\cos L_2 \cos Z'd_2$).

The ($\cos L_2$) voltage is applied to the stator winding 95 of resolver 94.

With reference to Equation 3, the $\sin L_1 \cos (B'r_2 - B'r_1) - (\cos L_1 \sin Z'd_1) \sin (B'r_2 - B'r_1)$ voltage applied to stator winding 94' of resolver 94, is equal to (sin $L_2$) of a right triangle whose angle is $L_2$, which is solved by the resolver 94 from the two input voltages of (sin $L_2$), and (cos $L_2$).

As stated, a mercury ballistic system including connected tanks 28, 29 is used to prevent wandering of gyroscope 11 from the true vertical, mercury being used because of its weight and quick response to gravity. But these advantages of a mercury system are accompanied by errors due to acceleration effects and therefore the system is usually disabled when the mount is changing speed or course, faster than a permissible rate, by a valve in the mercury flow pipe 28' connecting the tanks. Owing largely to the deleterious effects of mercury, such valves have not been entirely satisfactory and therefore the present invention dispenses with any sort of valve and substitutes a novel method of suspending mercury control on rapid turns and quick changes of speed, as in reversing a ship. This condition is determined and controlled by own ship's course or speed, or both. Own ship's course is fed from the compass self-synchronous transmitter to the terminals, 43, and its rate of change is computed by any known type of rate-taker indicated at 44, and current proportional to the rate is fed to the coil of the relay in the rate-taker 44. Own ship's speed is supplied to terminals 45 from a self-synchronous transmitter of a pitometer log, and calculator 46 determines its rate of change continuously and supplies current to the relay in the calculator 46. Rate taker 44 and calculator 46 may be of the well-known type comprising essentially a self-synchronous receiver driving a generator, whereby the output voltage of the generator is proportional to the first time rate of change of the angular position of the receiver.

The relay springs in the rate-taker 44 and calculator 46 are of such tension that a known value of coil current is required to overcome them and thus the relays are adapted to operate upon a known value of acceleration acting on the mercury system. Operation of either the relay in the rate-taker 44 or the relay in the calculator 46 energizes relay 18 which thereby actuates switch 18' to disconnect gyroscope rotating motor 15 from low to high frequency current source 17, so that motor 15 operates at increased speed.

The normal speed of the motor 15 when supplied from alternating current source 16 is such that resonance is used as previously explained, but when the relay 18 throws the motor circuits over to high-frequency source 17, such a great increase in speed occurs that all resonance is destroyed and thus the mercury is rendered ineffective, while the relay is energized. As soon as the temporary acceleration has passed, as determined by own ship's course and speed calculators 44 or 46, the springs reset the relays and the rotation is brought back to the resonant speed and the mercury ballistic system resumes control of the gyroscope.

The control of predictable apparent precession of the gyroscope 11 includes the calculator 21 of FIG. 1, which is shown in detail in FIG. 4, as comprising two correction mechanisms, the first being concerned with the effect of latitude of the amount on precession and the second being concerned with speed of the mount East or West. The first correction is of the form $K \cos L$, where L is the latitude angle and K is proportional to the product $H\omega$, where H is the angular momentum of the gyroscope wheel, and $\omega$ is the angular velocity of the earth. This speed K is set by the tap 48 on the potentiometer 49 and the value is fed into an electrical trigonometric resolver 50 of the induction type like 76. The angle input 51 of the resolver 50 is introduced by the hand-crank 53 to set dial 52 according to the latitude in which the instrument is located, and is reset from time to time as the latitude changes. The resultant current from resolver 50 is proportional to $K \cos L$, and is fed to solenoid 54, together with the result of the second correction, to be described.

Own ship's speed is received by self-synchronous receiver 55 and operates a slider 56 on the potentiometer 49 to continuously produce the electrical value representing own ship's speed which is fed to resolver 57. The angle input for resolver 57 is own ship's course, received on the self-synchronous receiver 58. The output is a voltage representing $S \sin C$ and is concerned with the East-West component of the speed of the mount since this component, in effect, increases or reduces the angular speed of the mount around the axis of the earth. This electrical value $S \sin C$ is added to the value $K \cos L$ and fed to solenoid 54, whose armature exerts a proportional torque on a pulley 59 mounted on the rotor of the drag synchronous receiver unit 60, whose rotor winding is energized from single phase alternating current source 16' and whose stator winding is periodically connected by wires 40 to the stator of torque unit 26 through switch 61. The electrical output of this unit 60 due to the drag is fed back by wires 40 to the torque unit 26, through the rotating switch 61 which is driven jointly in accordance with own ship's course, from the shaft of receiver 58, and the rate of bodily rotation of gyroscope 11, from gear 19, the combination being effected in the mechanical differential 62. Whenever switch 61 closes, relay 41 is energized to open the normally closed switch 41' and thus disconnect receiver 35 from transmitter unit 26 to prevent offset of receiver 35 as previously explained. Switch 61 is adapted to make one contact each revolution of the gyroscope 11, so that torque is applied to the rotor 30 of transmitter unit 26, and since rotor 30 is carried by a journal of gimbal ring 23, a torque is exerted for a short time to gyroscope 11 around axis 22—22 only when it is in proper orientation to correct the gyroscope for apparent precession. As shown, the unit 26 only is applying precessional torque, but it will be understood that all the other self-synchronous transmitters on the gyroscope axes may be caused to act in the same way, as rapidly as they come into position to do so, by a rotary switch having more contacts than the one shown at 61.

Figure 2:
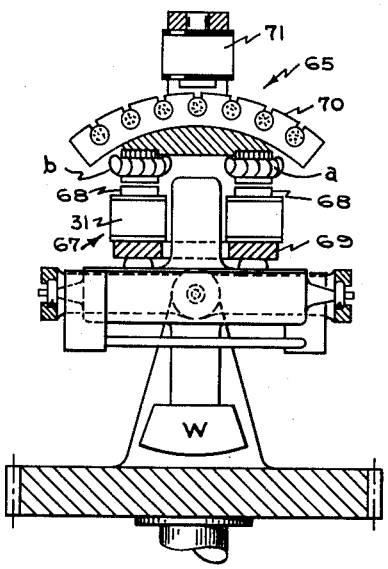
FIGS. 2 and 3 illustrate in partial section a modified form of the gyroscope gimbal trunnion magnetic mechanism, FIG. 3 being a side view of FIG. 2; and, FIG. 4 is a diagram of the calculator 21 of FIG. 1.
Figure 3:
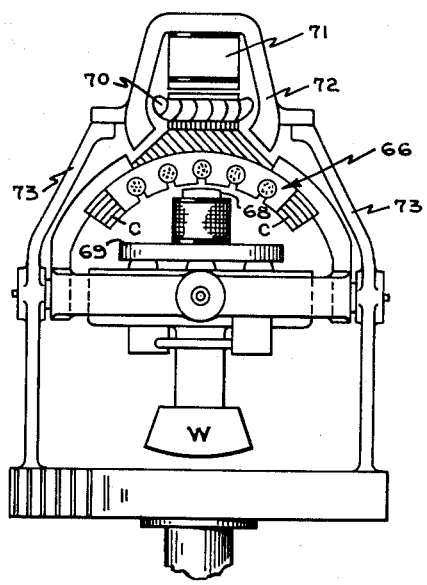

FIGS. 2 and 3 illustrate a modified form of the four half-synchronous units 26 and 27, shown in FIG. 1, which are replaced by three electromagnetic units 65, 66 and 67 which have the same function but which nest more compactly around the gyroscope case 11. In this arrangement the unit mounted directly on the gyroscope case 11 comprises two self-synchronous systems each being one-half of a conventional self-synchronous transmitter, having their stators $a$ and $b$ joined together, like those in FIG. 1, by laminated yokes $c$. The rotor 31 comprises a unit formed of two activating coils, one of which is shown in section in FIG. 3, the pole pieces 68 and a yoke 69 of circular form to embrace the gyroscope case. This unit measures and transmits the angular motions of the gyroscope case 11 about the axis 24—24 in the gimbal ring 23, applies torque about the same axis to the gyroscope wheel and tends to lift up the gyroscope case 11 to relieve weight from the sensitive bearings 24.

In order also to decrease the pressure on the other sensitive bearings 22 the same method is used but in this case a single half synchronous unit 65 is used, which comprises a rotor 70 with distributed winding, whereas in the forms previously described the distributed or three-phase winding was placed upon the stator. However, in each case it is relative motion which is being measured and therefore immaterial which element of the synchronous transmitter has the distributed winding. Alternating current flux is supplied by the electro-magnet 71, which energizes the distributed winding to produce the signal and also to apply upward force to the ring 23 to relieve pressure on the bearings 22. The coil 71 has virtually a closed magnetic circuit through the yoke 72 which embraces the ring 70, as shown. This yoke is fixedly connected to arms 73 extending upwards from the base 13, thus taking the weight of the assembly.

Although certain preferred embodiments of the invention have been illustrated and described herein, the invention is not limited thereby, but is susceptible of changes in form and detail within the scope of the appended claims.

I claim:

1. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said transmitter elements, a cooperating pair of electrical receiver elements, connections between said other transmitter element and one of said receiver elements for energizing the same, and mechanism adjustable in accordance with the position of said support relatively to the earth's surface for relatively displacing said receiver elements for thereby causing the transmitter elements to create a torque about the axis of said one gimbal ring.

2. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said elements, a cooperating pair of electrical receiver elements, connections between said other transmitter element and one of said receiver elements for energizing the same, mechanism adjustable in accordance with the position of said support relatively to the earth's surface for relatively displacing said receiver elements for thereby causing the transmitter elements to create a torque about the axis of said gimbal ring, and means responsive to a predetermined position of said member relatively to said support for rendering said mechanism effective.

3. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said elements, a cooperating pair of electrical receiver elements, connections between said other transmitter element and one of said receiver elements for energizing the same, mechanism adjustable in accordance with the position of said support relatively to the earth's surface for relatively displacing said receiver elements for thereby causing the transmitter elements to create a torque about the axis of said gimbal ring, means for rotating said gimbal mounting relatively to said support about an axis substantially perpendicular thereto, and means responsive to a predetermined rotational position of said mounting relative to its support for rendering said mechanism effective.

4. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said elements, a cooperating pair of electrical receiver elements, connections between said other transmitter element and one of said receiver elements for energizing the same, mechanism adjustable in accordance with the position of said support relatively to the earth's surface for relatively displacing said receiver elements for thereby causing the transmitter elements to create a torque about the axis of said gimbal ring, a normally open switch between said transmitter and receiver elements, and means responsive to a predetermined position of said member relatively to said support for closing said switch.

5. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said elements, a cooperating pair of electrical receiver elements, connections between said other transmitter element and one of said receiver elements for energizing the same, mechanism adjustable in accordance with the position of said support relatively to the earth's surface for relatively displacing said receiver elements for thereby causing the transmitter elements to create a torque about the axis of said gimbal ring, means for rotating said gimbal mounting relatively to said support about an axis substantially perpendicularly thereto, a normally open switch interposed between said transmitter and receiver elements, and means responsive to a predetermined rotational position of said mounting with respect to its support for closing said switch.

6. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said elements, a cooperating pair of electrical receiver elements, connections between said other transmitter element and one of said receiver elements for energizing the same, mechanism adjustable in accordance with the position of said support relatively to the earth's surface for relatively displacing said receiver elements for thereby causing the transmitter elements to create a torque about the axis of said gimbal ring, a second pair of electrical receiver elements energized by said means, a normally closed switch in the connections between said means and said second pair of elements, and operative connections between said mechanism and said switch for operating the latter upon relative displacement of said first receiver elements to render said second elements immune to such displacement.

7. In a member suspended in a gimbal mounting on an unstable traveling support, the combination of means for creating a precessional torque about at least one of the axes of said gimbal mounting, said means including a pair of electrical transmitter elements respectively actuated in accordance with the relative movement between one ring of said gimbal mounting and the support therefor, means for energizing one of said elements, a cooperating pair of electrical receiver elements, connections between said other transmitter element and one of said receiver elements for energizing the same, mechanism adjustable in accordance with the position of said support relatively to the earth's surface for relatively displacing said receiver elements for thereby causing the transmitter elements to create a torque about the axis of said gimbal ring, means for rotating said gimbal mounting relatively to said support about an axis substantially perpendicular thereto, means responsive to a predetermined rotational position of said mounting with respect to its support for rendering said mechanism effective, a second pair of electrical receiver elements energized by said means, a normally closed switch in the connections between said means and said second pair of elements, and operative connections between said mechanism and said switch for operating the latter upon relative displacement of said first receiver elements to render said second elements immune to such displacement.

8. In a member suspended in a gimbal mounting on an unstable traveling support, the combination of means responsive to the relative angular movements between co-operating parts of said gimbal mounting, said means including a pair of electrical transmitter elements respectively actuated in accordance with the relative movement between the corresponding gimbal mounting parts for transmitting electrical impulses to a corresponding remote receiver element, one of said parts being connected to the gimbal journal and the other to a relatively stationary member, and means for energizing one of said elements for creating a magnetic field inducing in the other element transmittable electrical impulses in response to relative movement between said gimbal parts and electromagnetically urging said one gimbal journal part unwardly to reduce the frictional weight thereof on the corresponding bearing.

9. In a member suspended in a gimbal mounting on an unstable traveling support, the combination of means responsive to the relative angular movement between a journal and a bearing of said gimbal mounting, said means including a pair of electrical transmitter elements respectively actuated in accordance with the relative movement between the corresponding gimbal journal and bearing and respectively connected thereto for transmitting electrical impulses to a corresponding remote receiver element, and means for energizing one of said elements for creating a magnetic field inducing in said other transmitter element transmittable electrical impulses in response to relative movement between said gimbal journal and bearing and for electromagnetically urging said journal upwardly to thereby reduce the frictional weight thereof on said bearing.

10. In a member suspended in a gimbal mounting on an unstable traveling support, the combination of means responsive to the angular movement between a journal and a bearing of said gimbal mounting, said means including a pair of electrical transmitter elements respectively actuated in accordance with the relative movement between the corresponding gimbal journal and bearing and respectively connected thereto for transmitting electrical impulses to a corresponding remote receiver element, said journal element including an electromagnet rotor mounted radially on said journal and said bearing element conforming to the curved path of movement of said journal element, and means for energizing one of said elements for creating a magnetic field inducing in said other transmitter element transmittable electrical impulses in response to relative movement between said journal and said bearing and for creating an upward electromagnetic pull on said journal element to thereby reduce the frictional weight of said journal on said bearing

References Cited in the file of this patent

UNITED STATES PATENTS

| | | |
|---|---|---|
| 1,213,692 | Rossiter et al. | Jan. 23, 1917 |
| 1,311,768 | Gray et al. | July 29, 1919 |
| 1,627,178 | Henry | May 3, 1927 |
| 1,942,470 | Bassett | Jan. 9, 1934 |
| 2,093,503 | Wittkuhns et al. | Sept. 21, 1937 |
| 2,293,092 | Wittkuhns | Aug. 18, 1942 |
| 2,339,508 | Newell | Jan. 18, 1944 |
| 2,405,028 | Ford | July 30, 1946 |
| 2,405,058 | Ross | July 30, 1946 |
| 2,414,108 | Knowles | Jan. 14, 1947 |
| 2,417,229 | Alexanderson | Mar. 11, 1947 |
| 2,427,130 | Ford | Sept. 9, 1947 |
| 2,427,158 | Poitras et al. | Sept. 9, 1947 |
| 2,435,581 | Greenland | Feb. 10, 1948 |
| 2,439,418 | Davenport | Apr. 13, 1948 |